(12) United States Patent
Sherrer et al.

(10) Patent No.: US 6,870,981 B2
(45) Date of Patent: Mar. 22, 2005

(54) OPTICAL SWITCH AND METHOD FOR MAKING

(75) Inventors: David W. Sherrer, Blacksburg, VA (US); Neal Ricks, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 292 days.

(21) Appl. No.: 09/828,842

(22) Filed: Apr. 10, 2001

(65) Prior Publication Data

US 2002/0146194 A1 Oct. 10, 2002

Related U.S. Application Data

(60) Provisional application No. 60/227,461, filed on Aug. 24, 2000.

(51) Int. Cl.[7] ............................. G02B 6/26; G02B 6/00
(52) U.S. Cl. ....................................................... 385/16
(58) Field of Search ........................ 385/16–24, 147, 385/31, 37, 44, 48, 88–90

(56) References Cited

U.S. PATENT DOCUMENTS

| | | |
|---|---|---|
| 3,864,018 A | 2/1975 | Miller |
| 4,120,923 A | 10/1978 | Kloker et al. |
| 4,150,870 A | 4/1979 | D'Auria |
| 4,165,496 A | 8/1979 | Di Domenico, Jr. et al. |
| 4,176,908 A | 12/1979 | Wagner |
| 4,210,923 A | 7/1980 | North et al. |
| 4,225,213 A | 9/1980 | McBride, Jr. et al. |
| 4,296,995 A | 10/1981 | Bickel |
| 4,325,604 A | 4/1982 | Witte |
| 4,407,562 A | 10/1983 | Young |
| 4,415,229 A | 11/1983 | McCullough |
| 4,498,730 A | 2/1985 | Tanaka et al. |
| 4,639,074 A | 1/1987 | Murphy |
| 4,699,457 A | 10/1987 | Goodman |
| 4,725,114 A | 2/1988 | Murphy |
| 4,756,590 A | 7/1988 | Forrest et al. |
| 4,859,022 A | 8/1989 | Opdahl et al. |
| 4,900,118 A | 2/1990 | Yanagawa et al. |
| 4,932,745 A | 6/1990 | Blonder |
| 4,973,127 A | 11/1990 | Cannon, Jr. et al. |
| 5,044,711 A | 9/1991 | Saito |
| 5,123,073 A | 6/1992 | Pimpinella |
| 5,127,084 A | 6/1992 | Takahashi |
| 5,135,590 A | 8/1992 | Basavanhally et al. |
| 5,177,804 A | 1/1993 | Shimizu et al. |
| 5,179,609 A | 1/1993 | Blonder et al. |

(List continued on next page.)

FOREIGN PATENT DOCUMENTS

| | | |
|---|---|---|
| DE | 3927441 | 2/1991 |
| EP | 0476241 | 3/1992 |

*Primary Examiner*—Akm Enayet Ullah
(74) *Attorney, Agent, or Firm*—Niels Haun; Jonathan D. Baskin

(57) ABSTRACT

A method for constructing an optical switch and the switch constructed thereby are described. An optical switch having a pair of chips is assembled with a plurality of optical fibers mounted on the chips such that endfaces of the fibers extend beyond ends of the chips. The optical fibers may be mounted by adhering them to the chips. The endfaces of the fibers and the front surfaces of the chips are then polished to provide coplanar surfaces which are good optical couplers. The chips are then etched with an etchant material which is ineffective at etching the optical fibers. The chips may include a coating which is resistant to the etchant material.

24 Claims, 5 Drawing Sheets

U.S. PATENT DOCUMENTS

| | | |
|---|---|---|
| 5,181,216 A | 1/1993 | Ackerman et al. |
| 5,185,825 A | 2/1993 | Shigematsu et al. |
| 5,185,846 A | 2/1993 | Basavanhally et al. |
| 5,187,758 A | 2/1993 | Ueda et al. |
| 5,257,332 A | 10/1993 | Pimpinella |
| 5,297,228 A | 3/1994 | Yanagawa et al. |
| 5,337,384 A | 8/1994 | Basavanhally et al. |
| 5,357,590 A | 10/1994 | Auracher |
| 5,379,361 A | 1/1995 | Maekawa et al. |
| 5,390,266 A | 2/1995 | Heitmann et al. |
| 5,440,655 A | 8/1995 | Kaplow et al. |
| 5,461,683 A | 10/1995 | Harman |
| 5,483,608 A | 1/1996 | Yokomachi et al. |
| 5,499,309 A * | 3/1996 | Kozuka et al. ............... 385/38 |
| 5,500,910 A | 3/1996 | Boudreau et al. |
| 5,500,911 A | 3/1996 | Roff |
| 5,555,333 A | 9/1996 | Kato |
| 5,566,262 A | 10/1996 | Yamane et al. |
| 5,568,585 A | 10/1996 | Kramer |
| 5,602,951 A | 2/1997 | Shiota et al. |
| 5,611,006 A | 3/1997 | Tabuchi |
| 5,623,564 A | 4/1997 | Presby |
| 5,699,463 A | 12/1997 | Yang et al. |
| 5,727,099 A | 3/1998 | Harman |
| 5,732,167 A | 3/1998 | Ishiko et al. |
| 5,757,991 A | 5/1998 | Harman |
| 5,778,123 A | 7/1998 | Hagan et al. |
| 5,785,825 A | 7/1998 | Hwang et al. |
| 5,828,800 A | 10/1998 | Henry et al. |
| 5,901,262 A | 5/1999 | Kobayashi et al. |
| 5,909,524 A | 6/1999 | Tabuchi |
| 5,920,665 A | 7/1999 | Presby |
| 6,044,781 A | 4/2000 | Noeltge |
| 6,045,270 A | 4/2000 | Weiss et al. |
| 6,056,696 A | 5/2000 | Kallman |
| 6,086,704 A | 7/2000 | Kanai et al. |
| 6,101,299 A | 8/2000 | Laor |
| 6,118,917 A | 9/2000 | Lee et al. |
| 6,160,936 A | 12/2000 | You et al. |
| 6,234,687 B1 | 5/2001 | Hall et al. |
| 6,320,997 B1 | 11/2001 | Dautartas et al. |
| 6,328,479 B1 | 12/2001 | Schofield et al. |
| 6,393,174 B1 | 5/2002 | Karaguleff et al. |
| 6,393,175 B1 | 5/2002 | Jurbergs et al. |
| 6,477,303 B1 | 11/2002 | Witherspoon |
| 6,519,382 B1 | 2/2003 | Jurbergs et al. |
| 6,625,356 B2 | 9/2003 | Ticknor et al. |
| 2001/0041026 A1 | 11/2001 | Steinberg et al. |
| 2002/0025104 A1 | 2/2002 | Steinberg et al. |
| 2002/0028037 A1 | 3/2002 | Steinberg et al. |
| 2002/0146194 A1 | 10/2002 | Sharrer et al. |
| 2003/0108272 A1 | 6/2003 | Sherrer et al. |

\* cited by examiner

OPTICAL SWITCH AND METHOD FOR MAKING

This application claims priority from provisional application serial No. 60/227,461, filed Aug. 24, 2000, the entire disclosure of which is incorporated herein by reference.

BACKGROUND

The present invention generally relates to optical switches, and more particularly to optical switches having fibers with slanted ends and a method for making such optical switches.

Optical switches having a pair of optical fibers, each having a slanted surface, are known. These conventional switches operate by displacing at least one of the fibers to contact the other fiber (closed position) or to release contact with the other fiber (opened position). In the closed position, input light is transmitted from one optical fiber to the other with little or no transmission loss. In the opened position, input light is reflected at least partially from one of the fibers, leading to complete or partial transmission loss. Complete transmission loss occurs during total internal reflection, when light approaches a dielectric interface at or above a critical angle and is thereby inhibited from being transmitted to the other optical fiber. When the angle is below the critical angle, or the distance between the optical fibers is sufficiently small, some input light may cross the gap between the optical fibers and thereby frustrate the total internal reflection.

FIGS. 1–4 illustrate a conventional optical switch 10 which includes a pair of optical fibers 12 and at least one pair of chips 16. The chips 16 each have a slanted edge surface 18, and each of the optical fibers 12 has a slanted face 14. The slanted nature of the faces 14 of the optical fibers 12 allows for total internal reflection when a pair of faces 14 are separated from one another. As shown in FIGS. 1–2, the slanted faces 14 and the slanted edge surfaces 18 are coplanar, thereby allowing contact between each of the surfaces 18 and each of the faces 14 when the optical switch is in the closed position.

In the opened position (FIG. 1), input light 22 reaches the face 14, which acts as a dielectric interface, and is translated into reflected light 24 which is reflected in a direction transverse to the opposing face 14. In the closed position (FIG. 2), the input light passes through the faces 14 and continues its transmission from one optical fiber 12 to the other optical fiber 12.

Conventionally, the faces 14, 18 of, respectively, the optical fibers 12 and the chips 16 are formed by polishing. The polishing step is performed to create faces 14 which are coplanar to each other. One observed disadvantage is that during polishing, the optical fibers 12 become abraded at a different rate than the chips 16. Specifically, the optical fibers 12 abrade at a quicker rate than the chips 16. Thus, sometimes the polishing process can result in the faces 14 of the optical fibers 12 not being coplanar with the faces 18 of the chips 16, leading to a greater gap between the fiber end faces 14 than between the chips' edge surfaces 18 (FIG. 3). When the chips 16 contact each other (FIG. 4), a gap 25 remains between the faces 14 of the optical fibers 12. In such a circumstance, the input light 22 breaks up into a partially reflected portion 26 and a partially transmitted portion 28. The partially transmitted portion 28 indicates a higher than desired transmission loss.

SUMMARY

The invention provides an optical switch that includes a pair of chips, each with an opposing face, and a pair of optical fibers, each with an opposing endface. Each of the optical fibers is initially mounted on a respective chip such that a portion of each optical fiber extends beyond the face of its respective chip upon final assembly.

The invention further provides a method for assembling an optical switch. The method includes mounting a pair of optical fibers on a pair of chips, wherein each optical fiber is mounted to overlap its respective chip a given distance, polishing endfaces of the optical fibers, and etching faces of the chips to ensure that each optical fiber overlaps its respective chip a second set distance.

The foregoing and other advantages and features of the invention will be more readily understood from the following detailed description of the invention, which is provided in connection with the accompanying drawings.

DETAILED DESCRIPTION OF THE PREFERRED EMBODIMENTS

Figure 1:
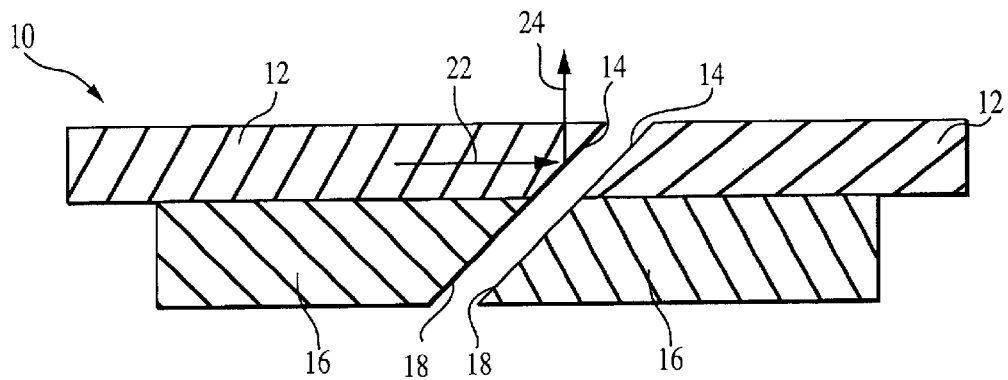
FIGS. 1–4 are cross-sectional views of a conventional optical switch.
Figure 2:
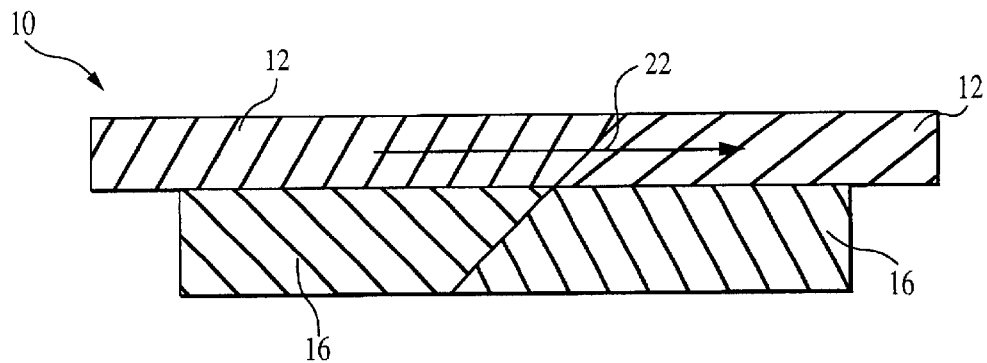
Figure 3:
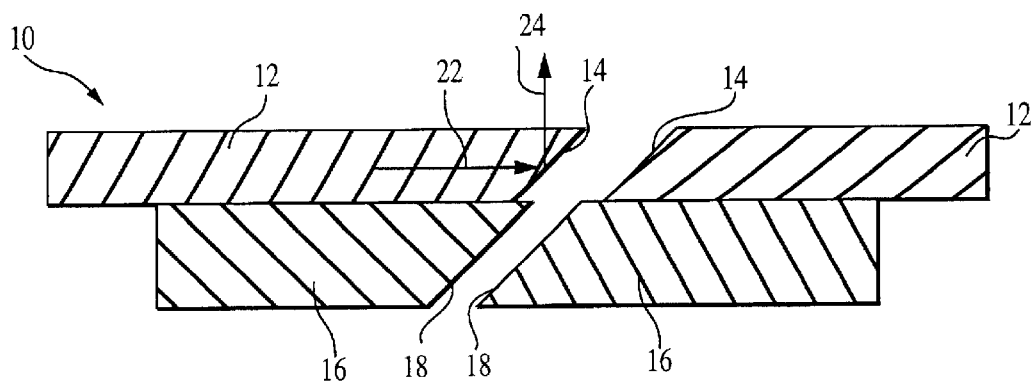
Figure 4:
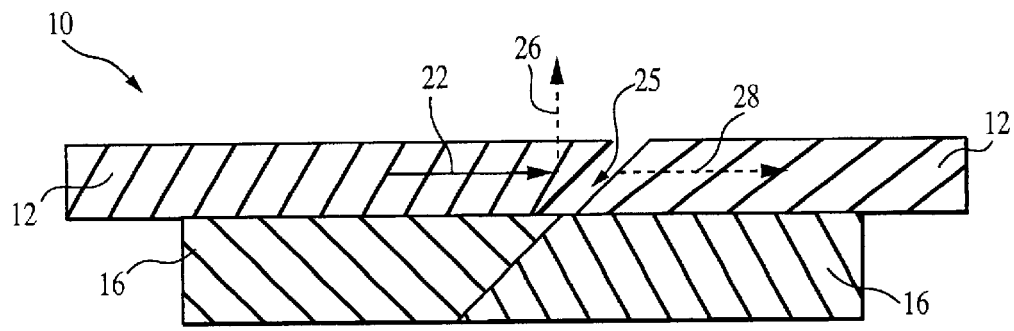
Figure 5:
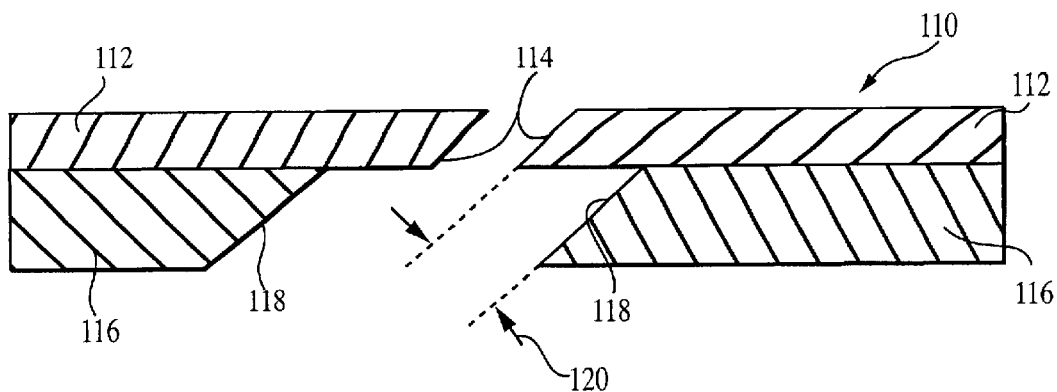
FIG. 5 is a cross-sectional view of an optical switch constructed in accordance with an embodiment of the invention.
Figure 6:
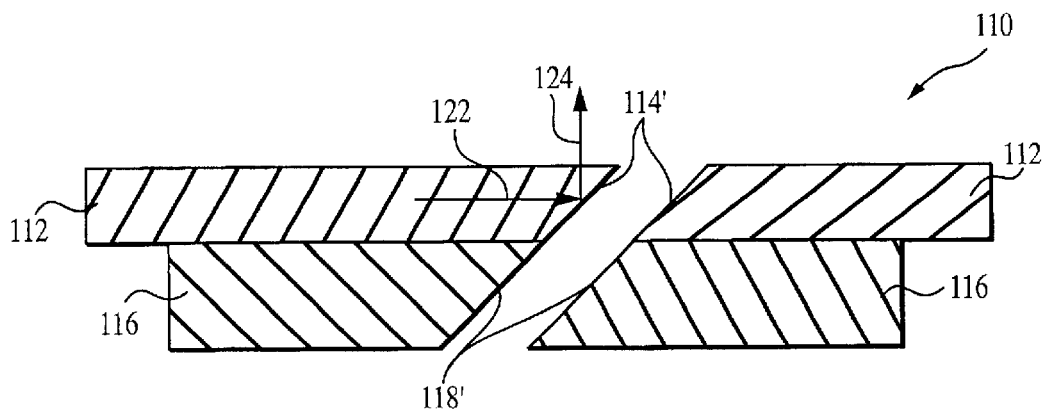
FIG. 6 is a cross-sectional view of the optical switch of FIG. 5 after polishing in the open position.
Figure 7:
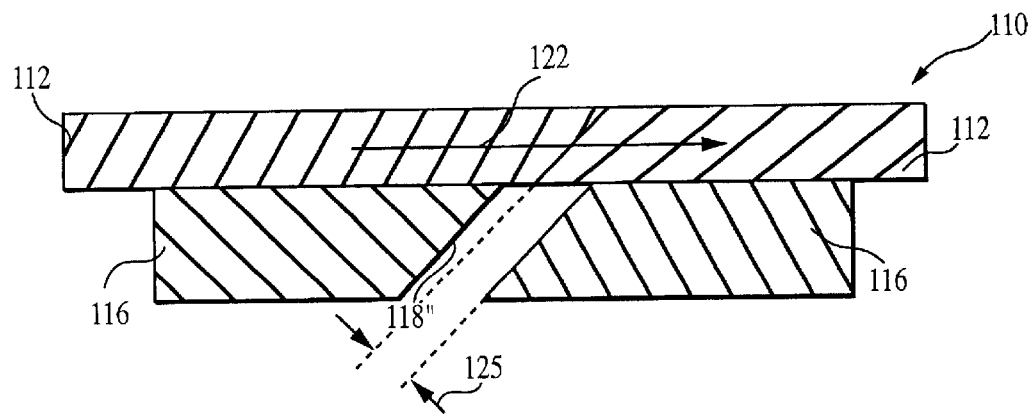
FIG. 7 is a cross-sectional view of the optical switch of FIG. 6 in the closed position.

With reference to FIGS. 5–7, in which like numerals designate like elements, there is shown an optical switch 110 which has a pair of optical fibers 112 and at least one pair of chips 116. The chips 116 are preferably formed of silicon, while the optical fibers 112 are preferably formed of silica. The optical fibers 112 may be mounted on the chips 116 through the use of an adhering material or mechanism. Any suitable adhering material or mechanism may be used, such as, for example, ultraviolet curable adhesive, solder, aluminum dioxide direct bonding, or Sol-Gel glass. The optical fibers 112 each include an unpolished endface 114 and the chips 116 each have an unpolished edge surface 118. The optical fibers 112 protrude over the surfaces 118 of the chips 116 a distance 120. Although a single pair of chips 116 are shown, it is to be understood that two or more pairs of chips 116 may be disposed about the optical fibers 112. The chips 116 may include grooves into which the optical fibers may be mounted.

The distance 120 is preferably chosen to at least compensate for the increased rate of abrasion experienced by the optical fibers 112 relative to the chips 116 during the polishing process. After assembly of the optical fibers 112 with the chips 116, the endfaces 114 and the surfaces 118 of, respectively, the optical fibers 112 and chips 116 are polished. The optical fibers 112, which are generally formed of a material less resistant to the abrasive characteristics of the polishing process than the chips 116 become more abraded than the chips 116. With specific reference to FIG. 6, the optical switch 110 is shown in the opened position with the polished endfaces 114' and the polished edge surfaces 118' generally flush with one another. It may be possible, depending upon a variety of factors, such as, for example, the materials used to form the optical fibers and the chips and to form the polishing material and/or the polishing procedure utilized, that the polished endfaces 114' may protrude slightly beyond the polished edge surfaces 118', or the polished edge surfaces 118' may slightly protrude beyond the polished endfaces 114'.

An additional etching step is generally employed next, especially if the polishing step eliminates the protrusion of the optical fibers 112 beyond the chips 116. Commercially available pre-mixed formulations of potassium hydroxide-based etchants such as, for example, a preferred silicon etchant PSE-200 manufactured by Transene Company, Inc. of Danvers, Mass., serve as a suitable wet chemistry for this purpose provided the selected etchant affords adequate selectivity to both the silica fibers and any adhesive or epoxies present. Additionally, a potassium hydroxide solution mixed from a solid pellet or concentrated liquid form with an appropriate amount of water or isopropyl alcohol as a diluent may be used to etch the chips 116. Exposing the optical array 110 to the etchant material creates etched edge surfaces 118" on the chips 116 (FIG. 7).

The optical switch 110 is shown in a closed position in FIG. 7. As shown, the polished endfaces 114' contact one another. Each of the polished endfaces 114' protrude beyond the surfaces 118" a distance 125. Preferably, the distance 125 is between about 0.4 microns and about three microns. By protruding the optical fibers 116 to a predetermined distance 125 past the surfaces 118" of the chips, the endfaces 114' are allowed to contact one another, thereby allowing the input light 122 to transmit from one of the optical fibers 112 to the other.

Figure 12:
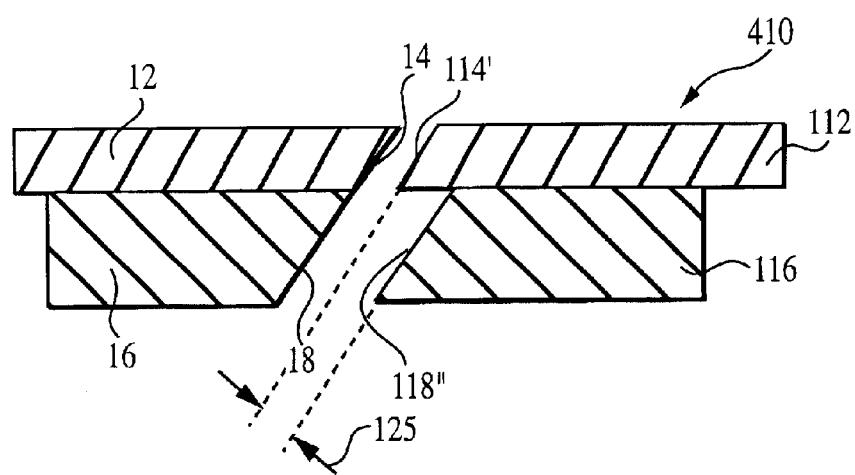
FIG. 12 is a cross-sectional view of an optical switch after etching and in the open position constructed in accordance with another embodiment of the invention.

FIG. 12 shows an alternative embodiment of the invention. An optical switch 410 is illustrated including an optical fiber 12 mounted on a chip 16 such that the endface 14 of the fiber 12 is generally flush with the surface 18 of the chip 16. In an opposing relationship, there is also illustrated an optical fiber 112 mounted on a chip 116 such that the fiber protrudes beyond the chip. Specifically, as described with relation to FIGS. 5–7, the optical fiber 112 and the chip 116 are polished and etched so as to obtain a polished endface 114' which protrudes a distance 125 beyond an etched edge surface 118". With such an arrangement, the optical switch 410 can move from the open position (as shown in FIG. 12) to the closed position in which the endfaces 14, 114' come in contact.

Figure 8:
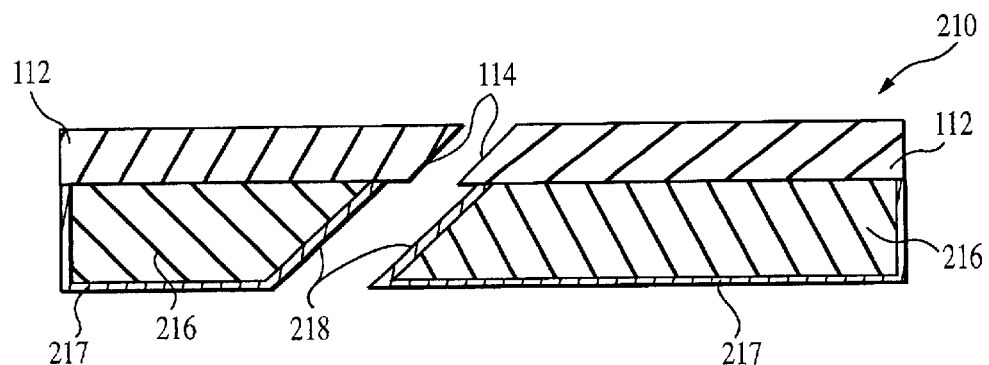
FIG. 8 is a cross-sectional view of an optical switch constructed in accordance with another embodiment of the invention.
Figure 9:
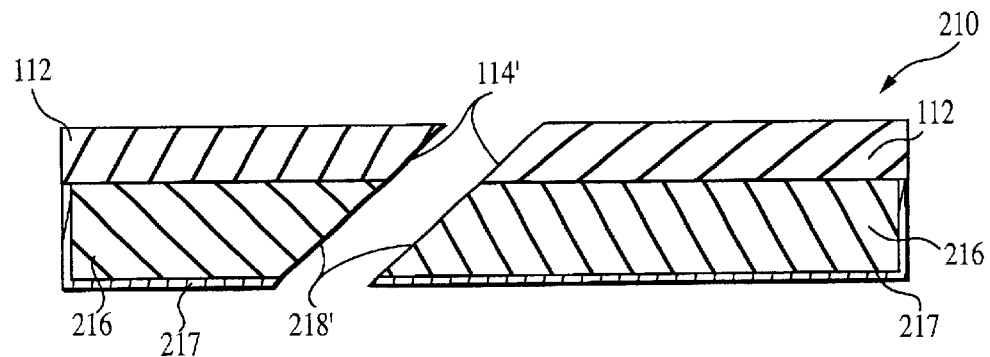
FIG. 9 is a cross-sectional view of the optical switch of FIG. 8 after polishing in the open position.
Figure 10:
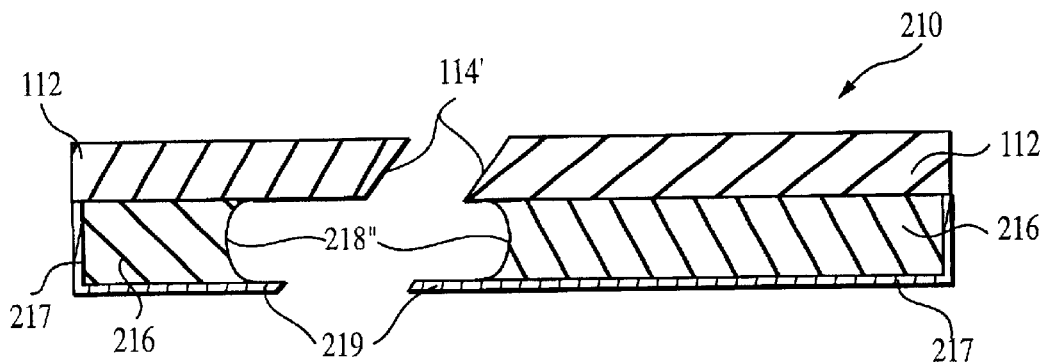
FIG. 10 is a cross-sectional view of the optical switch of FIG. 9 after etching in the open position.

FIGS. 8–10 illustrate another embodiment of the invention, specifically showing an optical array 210 having paired optical fibers 112 with endfaces 114 and paired chips 216. The chips 216 differ from the chips 116 in that they include a coating 217 on their outer surface. The coating 217 is formed of a material which is resistant to etchant materials, such as, for example, silicon nitride or silicon dioxide. Preferably, the coating 217 is chemical-vapor deposited on the chips 216. For example, the singulated chips 216 may be placed within a chemical-vapor deposition chamber and conformally deposited upon with the coating 217. Alternatively, the chips 216 may be selectively coated by application of the coating 217 on less than all of the surfaces of the chips 216, or have the coating present only upon the chip edge surface 218 and backside by depositing on the chips while still in wafer form, prior to singulation (dicing).

As shown in FIG. 8, the edge surfaces 218 are initially coated with the coating 217. Upon polishing the endfaces 114 and the surfaces 218, polished endfaces 114' remain which may or may not overlap the polished edge surfaces 218' of the chips 216 (FIG. 9). The polishing step abrades off the coating 217 which was covering the surfaces 218, leaving exposed the polished surfaces 218'. The optical array 210 is then exposed to the etchant material, which does not affect the endfaces 114' of the optical fibers 112, but etches the surfaces 218' of the chips 216, leaving etched edge surfaces 218" (FIG. 10). The etchant material does not affect the coating 217, leaving free standing portions 219 which are extremely fragile as a free standing structure and which may be subsequently removed with ease. By coating the chips 216 with the coating 217, the chips 216 are protected from the etchant material except at the surfaces 218.

Figure 11:
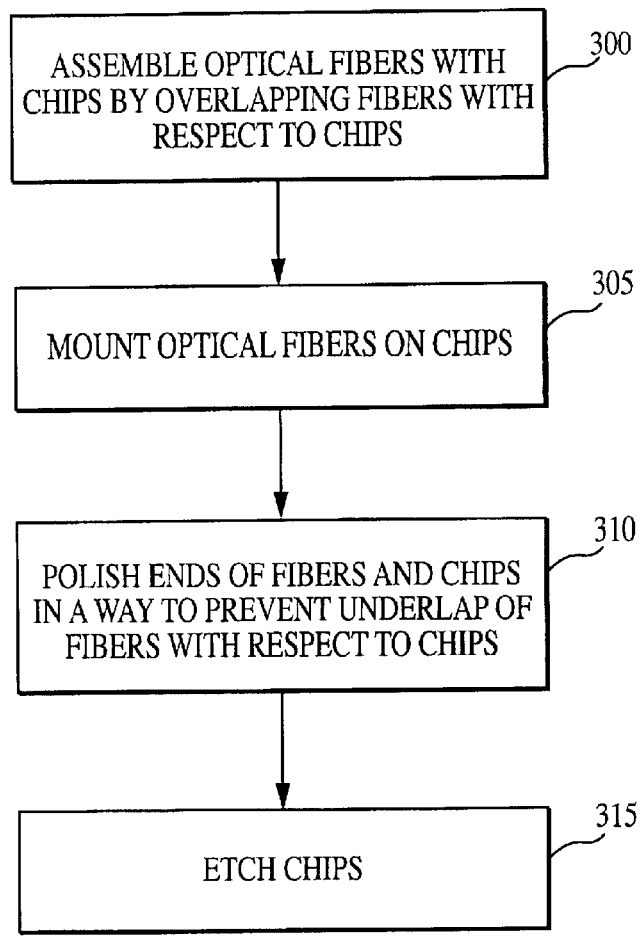
FIG. 11 is a flow diagram of steps taken to construct an optical switch in accordance with an embodiment of the invention.

FIG. 11 illustrates various steps used in a method to assemble the optical switch 110. At step 300, the optical fibers 112 are assembled with the chips 116. The assembly includes overlapping the optical fibers 112 with respect to the chips 116 to such an extent as to compensate for the polishing action. The optical fibers 112 then may be mounted upon the chips 116 by adhering the fibers 112 to the chips 116 at step 305. At step 310, the endfaces 114 of the optical fibers 112 and the surfaces 118 of the chips 116 are polished, leaving polished endfaces 114' and polished surfaces 118'. Finally, at step 315, an etchant material is used to etch the surfaces 118', leaving etched surfaces 118" which are overlapped by the optical fibers 112. The etchant material is chosen so as not to etch the optical fibers 112. Provided the chips are formed of silicon and the optical fibers are formed of silica, the etchant chemistry is chosen to preferentially etch the silicon chips with respect to the silica optical fibers.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, although the optical switch 110 has been shown and described with optical fibers having slanted endfaces 114 and slanted surfaces 118, it should be noted that the invention is not so limited. The endfaces 114 and the surfaces 118 may be parallel to one another. Accordingly, the invention is not to be seen as limited by the foregoing description, but is only limited by the scope of the appended claims.

What is claimed as new and desired to be protected by Letters Patent of the United States is:

1. An optical switch, comprising:
   a pair of chips, each with an opposing surface, at least one of said chips movable relative to the other chin to provide a switching function; and
   a pair of optical fibers, each with an opposing endface that is slanted relative to the fiber axis, wherein each said optical fiber is initially mounted on a respective said chip such that said endface of one of said optical fibers extends beyond said surface of its respective chip upon final assembly.

2. The optical switch of claim 1, wherein said endfaces are configured to conform to each other upon contact.

3. The optical switch of claim 2, wherein said endfaces are parallel to one another.

4. The optical switch of claim 1, wherein each said optical fiber is initially mounted on a respective said chip such that a portion including said endfaces of both of said optical fibers extends beyond said surface of their respective chips upon final assembly.

5. The optical switch of claim 4, wherein the distance which said portions of each said optical fiber extend beyond said surfaces of each respective chip upon initial mounting is sufficient to ensure that, after polishing said endfaces and surfaces, said endfaces extend at least as far as said surfaces of said chips.

6. The optical switch of claim 1, wherein said chips are formed of silicon.

7. The optical switch of claim 1, further comprising an etch resistant coating on said chips.

8. The optical switch of claim 7, wherein said coating is formed from silicon nitride.

9. The optical switch of claim 7, wherein said coating is formed from silicon dioxide.

10. An optical switch, comprising:
   a pair of chips, each with an opposing surface, at least one of said chips movable relative to the other chip to provide a switching a function; and
   a pair of optical fibers, each with an opposing endface that is slanted relative to the fiber axis, wherein each said optical fiber is initially mounted on a respective said chip such that said endface of one of said optical fibers extends beyond said surface of its respective chip upon final assembly and wherein said endfaces are configured to contact each other with said surfaces of said chips remain spaced apart a distance upon final assembly.

11. The optical switch of claim 10, wherein said distance is between about 0.4 microns and about 3 microns.

12. A method for assembling an optical switch, comprising:
   mounting a pair of optical fibers, each having an endface, on a pair of chips, each having a surface, wherein at least one of said optical fibers is mounted to protrude beyond said surface of its respective said chip;
   polishing at least one said endface of said optical fibers and at least one said surface of said chips; and
   etching at least one said surface of said chips to ensure that upon contact of said optical fibers said surfaces of said chips remain at a distance.

13. The method of claim 12, wherein said mounting comprises adhering said optical fibers to said chips.

14. The method of claim 12, wherein said endfaces of said optical fibers are transverse to a direction of light traveling through said optical fibers.

15. The method of claim 12, wherein said etching is accomplished through the use of an etchant material which is ineffective in etching said optical fibers.

16. The method of claim 15, wherein said etching comprises etching said chips with a potassium hydroxide material.

17. The method of claim 12, wherein both of said optical fibers are mounted to protrude beyond said surface of their respective said chips.

18. The method of claim 17, wherein said polishing comprises polishing both said endfaces of said optical fibers and both said surfaces of said chips.

19. The method of claim 12, further comprising coating said chips with a coating material prior to said polishing step.

20. The method of claim 19, wherein said coating is accomplished through chemical vapor depositing said coating material on said chips.

21. The method of claim 19, wherein said coating is accomplished through applying said coating material on selected surfaces of said chips.

22. The method of claim 19, wherein said polishing removes said coating material from at least one said face of said chips.

23. The method of claim 19, wherein said etching leaves free standing portions of said coating material.

24. The method of claim 23, further comprising removing said free standing portions of said coating material.

* * * * *